US008649248B2

(12) United States Patent
Nishimura et al.

(10) Patent No.: US 8,649,248 B2
(45) Date of Patent: Feb. 11, 2014

(54) OPTICAL INFORMATION RECORDING METHOD, OPTICAL INFORMATION REPRODUCTION METHOD AND OPTICAL DISK DEVICE

(75) Inventors: Koichiro Nishimura, Yokohama (JP); Yusuke Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 13/479,734

(22) Filed: May 24, 2012

(65) Prior Publication Data

US 2012/0243393 A1 Sep. 27, 2012

Related U.S. Application Data

(62) Division of application No. 12/485,131, filed on Jun. 16, 2009, now Pat. No. 8,208,358.

(30) Foreign Application Priority Data

Jun. 18, 2008 (JP) .................................. 2008-158624

(51) Int. Cl.
*G11B 5/09* (2006.01)

(52) U.S. Cl.
USPC .................................. 369/59.21; 369/124.05

(58) Field of Classification Search
USPC ........... 369/47.15, 53.2, 59.21, 59.22, 124.05
See application file for complete search history.

(56) References Cited

U.S. PATENT DOCUMENTS

| 6,654,325 B1 | 11/2003 | Minemura et al. |
| 6,876,618 B2 | 4/2005 | Tonami et al. |
| 7,616,547 B2 | 11/2009 | Lee et al. |
| 7,778,134 B2 | 8/2010 | Matsui et al. |
| 2003/0035236 A1 | 2/2003 | Satoh et al. |
| 2003/0090980 A1 | 5/2003 | Kashihara et al. |
| 2005/0128911 A1 | 6/2005 | Miyashita et al. |
| 2005/0141378 A1 | 6/2005 | Tatsuzawa et al. |
| 2005/0249318 A1* | 11/2005 | Minemura .................... 375/341 |
| 2005/0265199 A1 | 12/2005 | Nakano et al. |
| 2006/0092803 A1 | 5/2006 | Tatsuzawa et al. |
| 2007/0121463 A1 | 5/2007 | Minemura |
| 2007/0140088 A1 | 6/2007 | Hino et al. |
| 2008/0298195 A1* | 12/2008 | Kanatake et al. ........... 369/53.36 |

FOREIGN PATENT DOCUMENTS

| JP | 08-096312 | 4/1996 |
| JP | 2001-155429 | 6/2001 |
| JP | 2001-216735 | 8/2001 |
| JP | 2004-178267 | 6/2004 |
| JP | 2005-339690 | 12/2005 |
| WO | WO2005/031743 | 4/2005 |
| WO | WO 2005/046097 | 5/2005 |

\* cited by examiner

*Primary Examiner* — Wayne Young
*Assistant Examiner* — Brenda Bernardi
(74) *Attorney, Agent, or Firm* — Antonelli, Terry, Stout & Kraus, LLP.

(57) ABSTRACT

When a phase shift is to be evaluated, based on a difference between an output from a waveform equalization circuit to equalize an input reproduced signal to a predetermined target equalization characteristic and the target equalization characteristic, the phase shift of the reproduced signal relative to a channel clock, a group delay characteristic with respect to the frequency of the waveform equalization circuit is fixed. Hence, an equalized waveform as an output from the waveform equalization circuit can preserve phase shift information of the inputted reproduced signal to correctly detect the phase shift of the reproduced waveform using the equalized waveform. It is hence possible to realize, with high precision, optimal value learning of various parameters for the recording, reproduction, and servo by use of the phase shift as an index.

10 Claims, 17 Drawing Sheets

FIG. 4
| dTtop | Mark | | | |
|---|---|---|---|---|
| *S*M | 2 | 3 | 4 | >5 |
| Space 2 | 0.2 | 0.15 | 0.15 | 0.1 |
| 3 | 0.2 | 0.15 | 0.15 | 0.1 |
| 4 | 0.15 | 0.1 | 0.1 | 0.1 |
| >5 | 0.15 | 0.1 | 0.1 | 0.1 |
| dTeclp | Mark | | | |
|---|---|---|---|---|
| *S*M | 2 | 3 | 4 | >5 |
| Space 2 | −0.2 | −0.2 | −0.3 | −0.3 |
| 3 | −0.25 | −0.3 | −0.3 | −0.3 |
| 4 | −0.3 | −0.35 | −0.35 | −0.35 |
| >5 | −0.3 | −0.35 | −0.35 | −0.4 |
FIG. 5
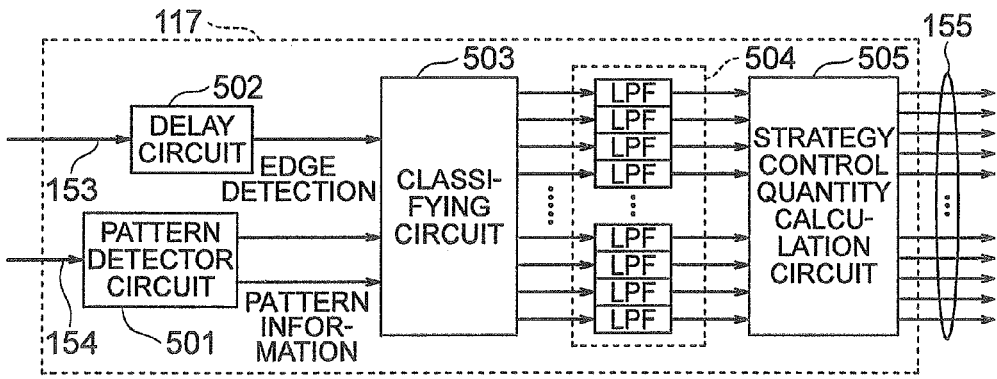
FIG. 6
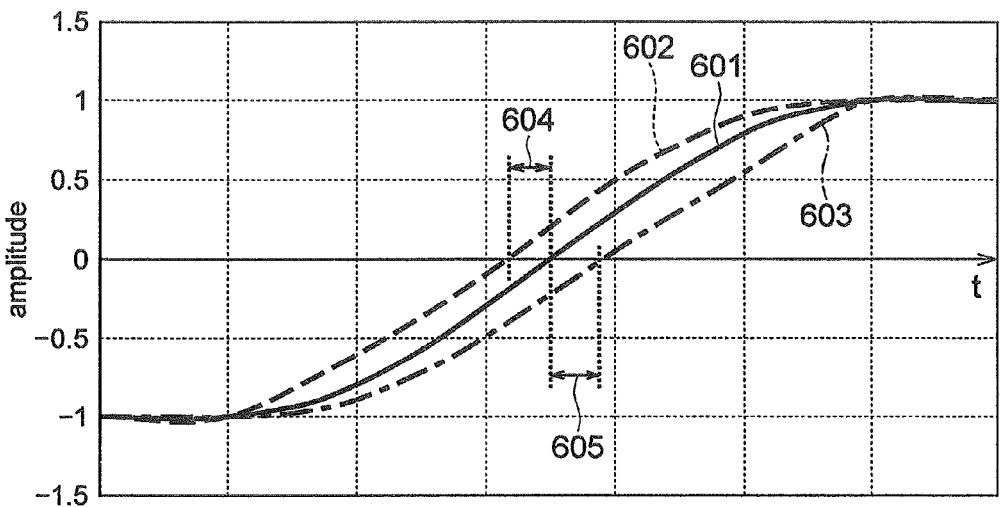

OPTICAL INFORMATION RECORDING METHOD, OPTICAL INFORMATION REPRODUCTION METHOD AND OPTICAL DISK DEVICE

INCORPORATION BY REFERENCE

The present application is a divisional application of U.S. Ser. No. 12/485,131, filed on Jun. 16, 2009 now U.S. Pat. No. 8,208,358 which claims priority from Japanese application JP2008-158624 filed on Jun. 18, 2008, the content of which is hereby incorporated by reference into this application.

BACKGROUND OF THE INVENTION

The present invention relates to an information recording method of optically recording information on a recording medium by use of laser light and a recorder using the method.

In a case wherein binary information or information of multivalue more than the binary information is recorded on a recording medium by use of laser light, there is generally required optimization learning for a laser pulse contour, i.e., a so-called recording strategy to record information on the recording medium, which is referred to as recording learning hereinbelow. In the recording learning, a record waveform is reproduced to be evaluated to learn an optimal recording strategy in the system. As evaluation indices, there are employed jitter which is defined as an undesirable shift of a waveform edge along a time-axis, asymmetry which is a shift thereof in an amplitude direction, a "β" value and the like.

On the other hand, in a system which uses laser light to conduct binary information recording on a recording medium and binary information reproduction therefrom, a photoelectric converter to convert laser light into an electric signal as well as an electric signal transmitter and a processing apparatus have a finite frequency characteristic. Hence, as the signal recording and reproduction speed for the recording medium increases, the signal amplitude and the SN ratio of the signal are lowered and inter-symbol interference occurs for signals. Since these appears as distortion in a reproduced waveform, the evaluation indices cannot be correctly detected in the recording learning described above.

As a scheme to prevent these problems, there has been proposed recording learning which is based on an evaluation index and which uses a Partial Response and Maximum Likelihood (PRML) decoder (e.g., JP-A-2005-339690). The PRML is a scheme in which signals reproduced from a recording medium by laser light are equalized by use of schemes such as adaptive equalization to belong to a known Partial Response (PR) class. Maximum Likelihood (ML) decoding is conducted for the signals according to an equalization target of the PR class to estimate a most likely signal sequence to conduct binarization judgment. By conducting the ML decoding after executing the equalization processing according to a PR class similar to the frequency characteristic of the transmission system as above, stable binary signal reproduction is possible even when the band of the transmission system is lower than the reproduced signal band.

Viterbi decoding processing exists as representative decoding processing of the ML decoding. There has been also disclosed adaptive viterbi decoding processing in which a reference value employed in the processing is adjusted to the equalization output waveform of the preceding stage (e.g., JP-A-2004-178627).

The evaluation indices for the reproduced waveform in the recording learning by use of the PRML may include, for example, a difference between the equalization target value and the equalized output waveform, i.e., a so-called equalization error and its total value. However, since the PRML processing uses the adaptive equalization processing, the waveform distortion such as a phase distortion included in the reproduced waveform is corrected in the adaptive equalization processing, and hence the reproduced waveform cannot be correctly evaluated. Therefore, by executing the adaptive equalization processing with a fixed group delay characteristic, waveform distortion information included in the reproduced waveform is sustained. Hence, the reproduced waveform can be correctly evaluated (e.g., WO2005-031743).

SUMMARY OF THE INVENTION

The adaptive equalization processing in PRML aims to equalize an input reproduced waveform to a waveform conforming to the reference value of the viterbi decoding processing in the succeeding stage. For example, if the recording medium is largely tilted in the tangential direction, the waveform response characteristic distorts due to distortion or the like of the spot contour on the medium. Hence, distortion takes place also in the reproduced signal obtained from the recording medium. The group delay of this distortion is not fixed. Hence, in the adaptive equalization processing, by applying to the reproduced signal a reverse characteristic thereof, i.e., a characteristic in which the group delay characteristic is reversed, it is possible to compensate for the distortion to equalize the signal to the waveform conforming to the reference value of the viterbi decoding processing in the succeeding stage. However, the adaptive equalization processing with a fixed group delay characteristic as described above cannot compensate for the distortion of the reproduced signal. This accordingly causes a binarization processing error in the viterbi decoding processing.

The present invention solves the above problem and enables both of the securing of quality in the information reproduction through the PRML processing from a recording medium and the recording parameter learning in the high-speed recording an reproduction by use of the ML decoder such as the PRML processing. The learning processing which uses the ML decoder is expandable for the learning of reproduction and servo parameters. The present invention may be expanded for the information reproduction from a recording medium and the recording parameter learning in a situation wherein the adaptive viterbi decoding processing is employed.

It is therefore an object of the present invention to implement stabilization and power saving in the recording learning operation as well as minimization of the learning time.

The above object is achievable, for example, in the recording parameter learning using the ML decoding scheme such as the PRML processing in the high-speed recording and reproduction and in the information reproduction through the PRML processing from a recording medium in the high-speed recording and reproduction, by conducting a changeover between processing in which the group delay characteristic is fixed in the adaptive equalization processing and processing in which the group delay characteristic is not fixed therein.

The present invention enables both of the securing of quality in the information reproduction through the PRML processing from a recording medium and the evaluation of reproduced signals by use of ML decoder scheme such as the PRML processing in the high-speed recording and reproduction. As a result, for the S/N deterioration of signals or the like due to the restriction of the signal transmission characteristic and the increase in the density of record information, the recording parameter and the servo parameter can be stably adjusted through the stable information reproduction and the detection of the signal edge phase shift by use of the PRML. Hence, the high-speed recording and reproduction by realizing a high transfer rate for the to-be-recorded information and reproduced information as well as various adjustments can be conducted at one and the same speed. Heat generated due to increase in the motor load caused by the speed change can be reduced and occurrence of the rotary regulation wait time associated with the speed change can be suppressed. It is hence possible to implement the stabilization and power saving in the recording learning operation as well as to minimize the learning time.

BRIEF DESCRIPTION OF THE DRAWINGS

FIG. 4 is a diagram showing an example of recording compensation of the recording strategy.

FIG. 5 is a configuration diagram of a phase shift detector circuit of FIG. 1.

FIG. 6 is a graph showing an example of reproduced waveforms.

DESCRIPTION OF THE EMBODIMENTS

Description will be first given of structure and learning of the recording strategy.

Figure 2:
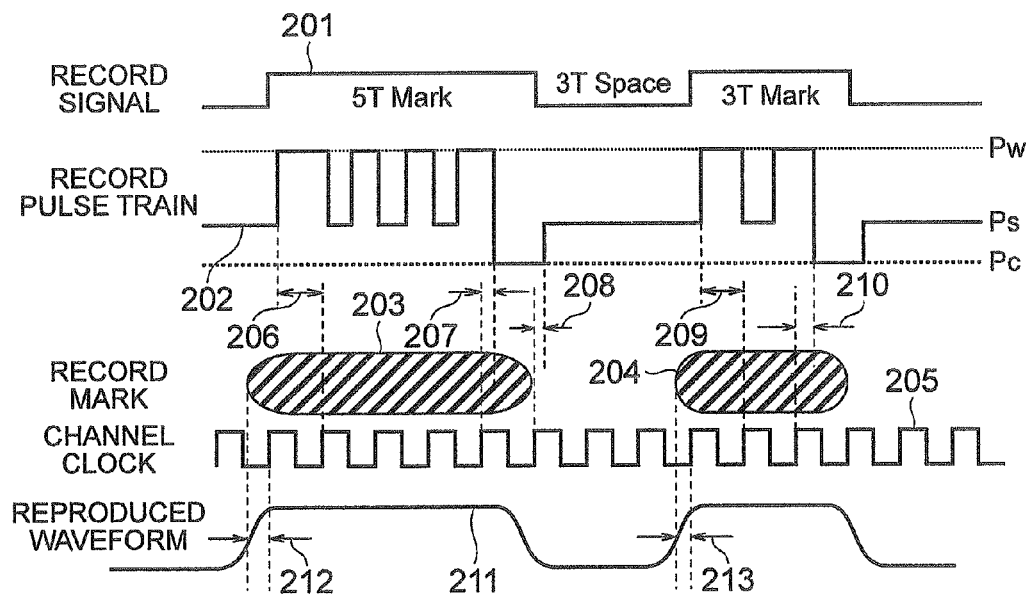
FIG. 2 is a schematic diagram showing a relationship among a recording strategy, a mark and a space on the disk, and a reproduced waveform thereof.

FIG. 2 shows an example of the recording strategy. 201 indicates a record signal to be recorded on an optical disk and 202 is a recording strategy thereof. The recording strategy is controlled by laser power (to be referred to as recording power hereinbelow) and a laser pulse edge position (to be referred to as pulse timing hereinbelow). The recording power corresponds to Pw, Ps, and Pc in the diagram and the pulse timing corresponds to numerals 206 to 210 in the diagram. In this regard, the diagram shows part of the pulse timing.

These parameters vary in their optimal values according to devices, disks, and recording conditions thereof. Hence, before the recording, parameters are learned, i.e., the so-called recording learning is carried out.

Figure 3:
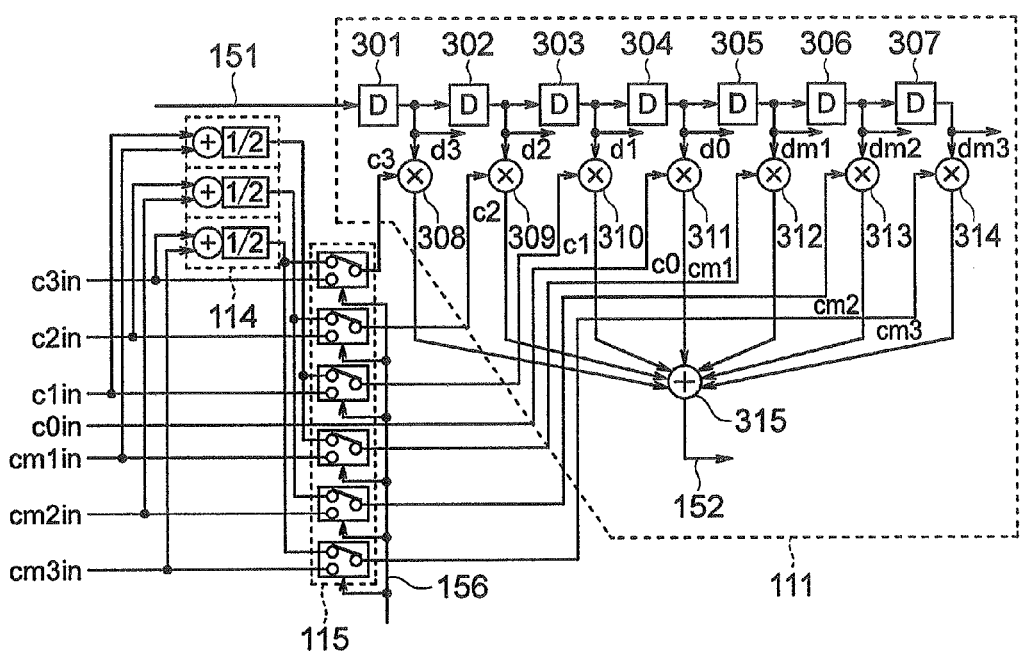
FIG. 3 is a detailed diagram of an FIR filter and its peripheral circuits of FIG. 1.

When forming a mark on a disk by laser light, thermal interference occurs from preceding and succeeding marks. Hence, for some pulse timing, there is conducted control called phase compensation to adjust the pulse timing based on a combination of a mark to be recorded and spaces before and after the mark. FIG. 3 shows an example of a compensation table to be used for the phase compensation of pulse trains 206 (dTtop) and 208 (Teclp) of FIG. 2. In dTtop, there are determined pulse timing setting values when the preceding space and the pertinent mark range respectively from 2 T to 5 T. In Teclp, there are determined pulse timing setting values when the pertinent mark and the succeeding space are respectively from 2 T to 5 T.

Next, by referring to drawings, description will be given of embodiments according to the present invention.

Embodiment 1

Figure 1:
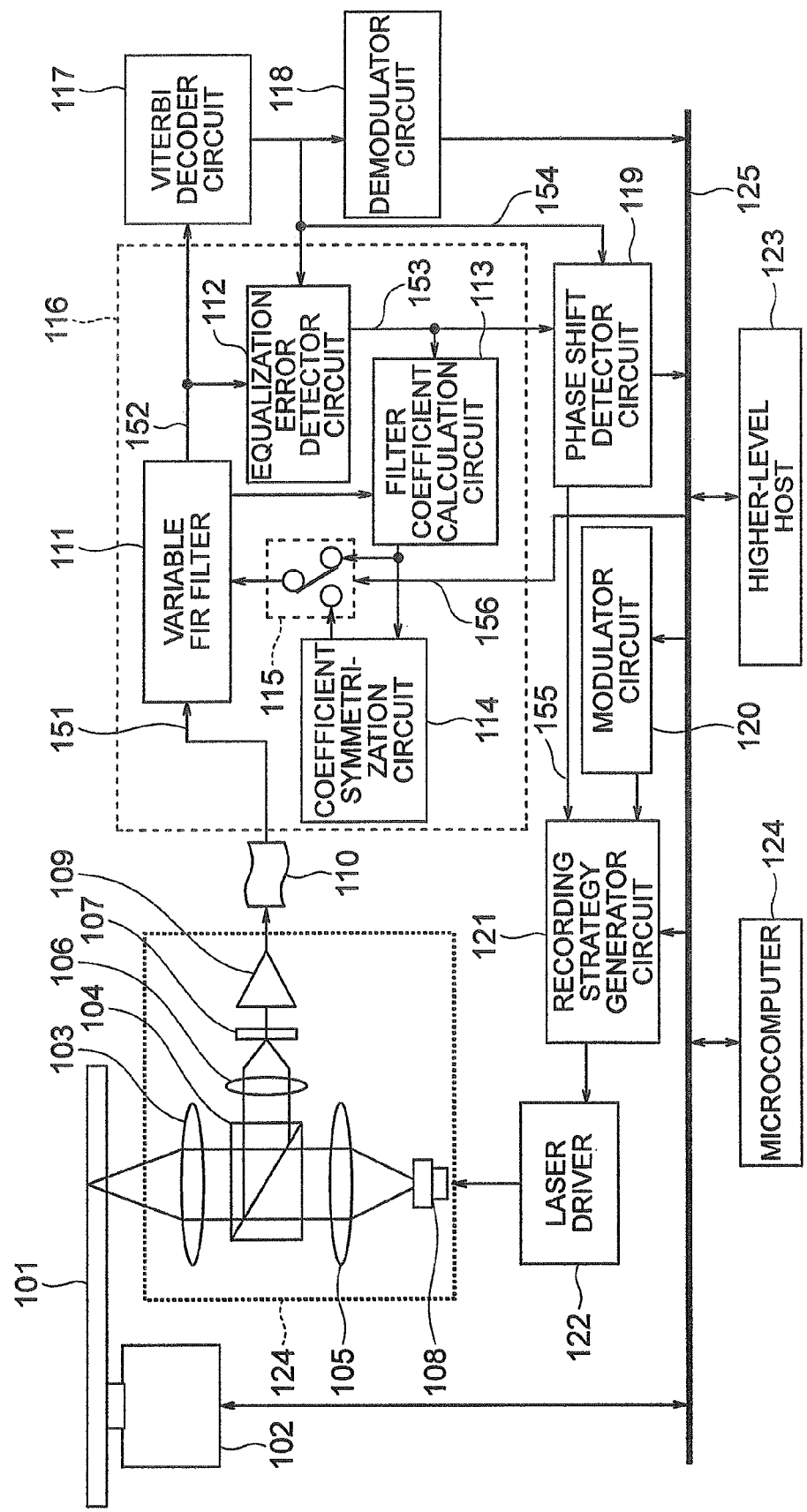
FIG. 1 is a configuration diagram of an optical disk device in a first embodiment.

FIG. 1 shows a system configuration of the first embodiment.

Information data outputted from a higher-level host 123 via a signal bus 125 is modulated by a modulator circuit 120 into a disk record signal. A recording strategy generator circuit 121 generates the recording strategy described above by use of a disk record signal, a pulse timing setting value 155 outputted from a phase shift detector circuit, recording power setting from a microcomputer 124, and the like. A laser driver 122 drives a laser 108 according to the recording strategy. Laser light radiated from the laser 108 records via a collimation lens 105 and an objective 103 a mark on an optical disk 101. As a result, data is recorded on the optical disk 101.

Next, in an operation to reproduce data recorded on the optical disk 101, reflected light obtained by radiating laser light onto the optical disk 101 is collected via a beam splitter 104 by a condenser 106 onto a photoelectric conversion element 107 to be converted into an electric signal (to be referred to as a reproduced signal hereinbelow) through processing such as amplification and voltage conversion by an amplifier 109. The reproduced signal is inputted via a transmission path such as a flexible cable to a PRML processing circuit. The PRML circuit includes an adaptive equalizer circuit 116 and an ML decoder circuit, i.e., a viterbi decoder circuit 117 as its general example. In the PRML processing, the adaptive equalizer circuit 116 equalizes the reproduced signal to a target equalization characteristic and then the viterbi decoder circuit 117 executes binarization processing for the signal according to the equalization characteristic.

The adaptive equalizer circuit includes an FIR filter 111, an equalization error calculation circuit 112, a filter coefficient calculation circuit 113, a coefficient symmetrization circuit 114, and a switch 115.

FIG. 3 shows a detailed configuration of the FIR filter 111 of FIG. 1 and its peripheral circuits. The FIR filter of this embodiment is a 7-tap filter. In the diagram, 301 to 307 indicate delay elements of one-period (1 T) units of a reproduction clock synchronized with the reproduced signal, 308 to 314 are multiplier circuits, and 315 is an adder circuit. Signals obtained by passing the reproduced signal 151 through the respective delay elements are multiplied by predetermined coefficients c3 to −cm3. The results are added to each other to obtain an equalized signal 152.

The equalization error calculation circuit 114 calculates an error between the equalized signal and the target equalization characteristic.

The target equalization characteristic is represented as multiplication coefficient values of the FIR filter as for the filter described above. In this embodiment, an PR(1,2,2,1) characteristic in which the multiplication coefficient values of the 4-tap filter are 1, 2, 2, and 1 are employed as the equalization target.

For PR(1,2,2,1), ten output values from quadripartite-time totaling of binary signals are set as reference values. Table 1 shows these reference values. The equalization error calculation circuit outputs an equalization error 153 which is a difference between the reference values and the equalization signal 152 at each point of time. The reference value at each point of time is selected from a binary signal pattern which corresponds to the equalization signal and which is produced by the viterbi decoder circuit 171.

TABLE 1

| EQUALIZARION = PR(1, 2, 2, 1) | Ref. value |
|---|---|
| REF 1111 | 6 |
| REF 1110 | 4 |
| REF 0111 | 4 |
| REF 0110 | 2 |
| REF 1110 | 0 |
| REF 0011 | 0 |
| REF 1001 | −2 |
| REF 1000 | −4 |
| REF 0001 | −4 |
| REF 0000 | −6 |

The filter coefficient calculation circuit 113 calculates a setting values of the tap coefficients ranging from cm3 to c3 of the FIR filter 111. The coefficient values are updated to minimize the equalization error output 153 using the method of least squares, the steepest-descent method, and the like. For example, in the least square averaging method based on the steepest-descent method, each equalization coefficient is updated according to the following expression by use of the equalization error output 153 and each tap output (d3 to dm3) from the FIR filter 111.

$$c^*(t+1) = c^*(t) X(\mu \times err \times d^*(t))$$

in the above expression, $\mu$ is a converging speed coefficient, which is a value to control the coefficient update speed.

The coefficient symmetrization circuit 114 is a circuit to average coefficients of tap outputs which are symmetric with respect to the tap center of the FIR filter 111, and includes a divider circuit of ½ using an adder circuit, a bit shift, and the like.

The switch 115 is a switch to select, as the coefficient of the FIR filter 111, an output from the filter coefficient calculation circuit 113 or an output from the coefficient symmetrization circuit 114.

The equalized signal 152 outputted from the adaptive equalizer circuit 116 is inputted to the viterbi decoder circuit 117. The viterbi decoder circuit 117 conducts a branch metrics operation for the inputted equalized signal 152 and accumulates the result in a path memory to thereby output a binary signal. In the branch metrics operation, there is calculated an error between the filter output waveform 152 and a target equalization output obtained by equalizing, by use of PR(1, 2,2,1) as the equalization target, all binarization patterns of the modulation rules. The path memory selects and outputs, as the binary signal of the equalized signal, a signal pattern for which the total value of the results of the operation takes a minimum value.

The outputted binary signal is decoded by a decoder circuit 118 into a data signal to be sent to the higher-level host 123.

A phase shift detector circuit 119 detects a phase shift of the reproduced waveform using the equalization error signal 153. FIG. 5 shows structure of the phase shift detector circuit 119. In the diagram, a circuit 501 detects mark and space patterns to conduct record compensation based on a viterbi decoding result 154. 502 is a delay circuit to match the phase of the equalization error signal 153 with that of pattern information obtained by inputting the viterbi decoding result 154 to a pattern detector circuit 501. In a classification circuit 503, the equalization error signal 153 is classified according to the mark and space patterns obtained by the pattern detector circuit 401. A group of Low Pass Filters (LPF) 504 averages the classified equalization errors to suppress defects and fingerprints on the disk and other local influence in the reproduction. A strategy control quantity calculation circuit 505 compares the equalization errors averaged by the respective mark and space patterns with predetermined target error amounts respectively set in advance, and then conducts, based on the differences therebetween, parameter control of pulse timing associated with the respective mark and space patterns. The pulse timing value 155 calculated as above is inputted to the recording strategy generator circuit 121.

Next, description will be given of a method of controlling the pulse timing of the recording strategy based on the equalization error signal.

FIG. 6 shows an example of the reproduced waveform. In the graph, the abscissa represents time and the ordinate represents the waveform amplitude. 601 indicates an ideal input waveform without any phase shift, 602 is a waveform phase-shifted forward in the time axis, and 603 is a waveform phase-shifted backward in the time axis. In this situation, the forward phase shift is indicated by 604 and the backward phase shift is indicated by 605. It can be seen from this example that the backward phase shift is larger.

Figure 7:
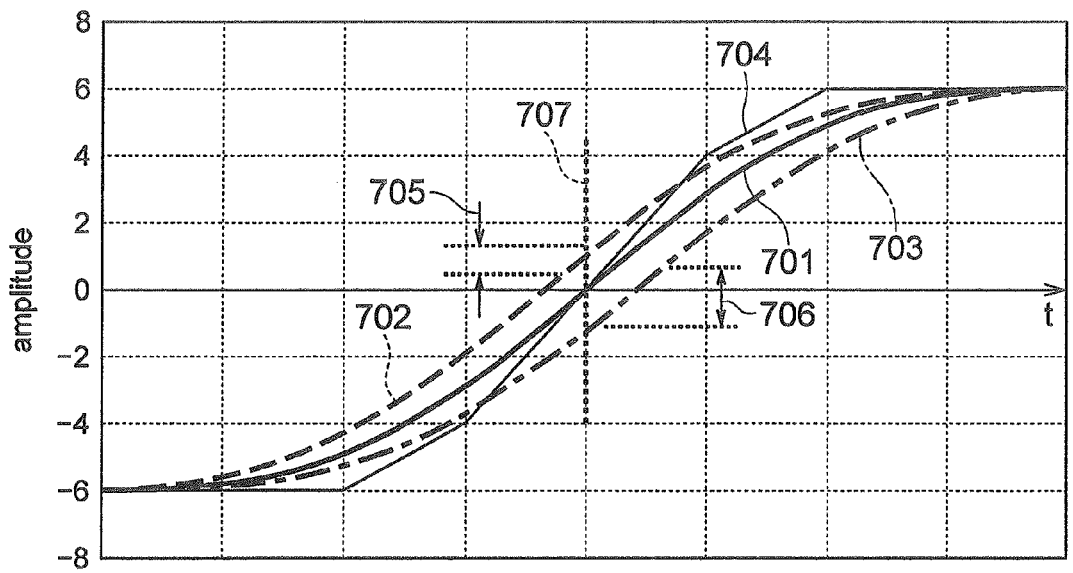
FIG. 7 is a graph showing a fixed equalization output waveform of FIG. 6.

FIG. 7 shows an equalization output waveform when the waveform of FIG. 6 is passed through a 4-tap fixed characteristic filter having a characteristic of PR(1.2.2.1). As in FIG. 6, the abscissa represents time and the ordinate represents amplitude of the waveform. Between FIGS. 7 and 6, the equalization output waveform 601 corresponds to 701, the equalization output waveform 602 corresponds to 702, and the equalization output waveform 603 corresponds to 703. 704 indicates an equalization output waveform when the binary signal of 601 is inputted to the above filter. This is a target equalization output to obtain the equalization error.

In the graph, the equalization error at a reproduced waveform edge point 707 is zero in the waveform 701, 705 in the waveform 702, and 706 in the waveform 703. It can be seen that the equalization errors 705 and 706 correspond to the phase shifts 604 and 605, and the polarity and the order in magnitude are kept retained. Hence, in a fixed characteristic filter, by controlling pulse timing of the recording strategy to minimize the equalization error at the edge point of the equalization output of the reproduced waveform, an optimal recording characteristic can be obtained.

However, for the correspondence to the reduction in the SN ratio of the reproduced signal and the inter-symbol interference caused by insufficient transmission band in association with the high-speed recording and reproduction as described above, it is required to adapt the equalization characteristic to the reproduced signal. The so-called adaptive equalization processing is required.

Figure 8:
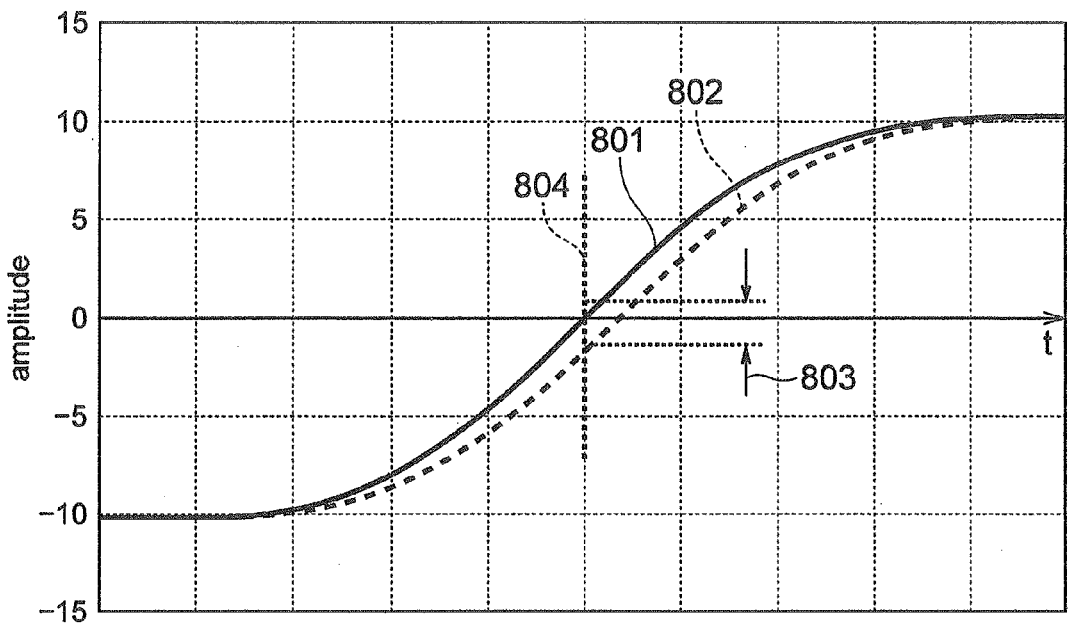
FIG. 8 is a graph showing an example of adaptive equalization output waveforms for a phase forward shift waveform of FIG. 6.
Figure 9:
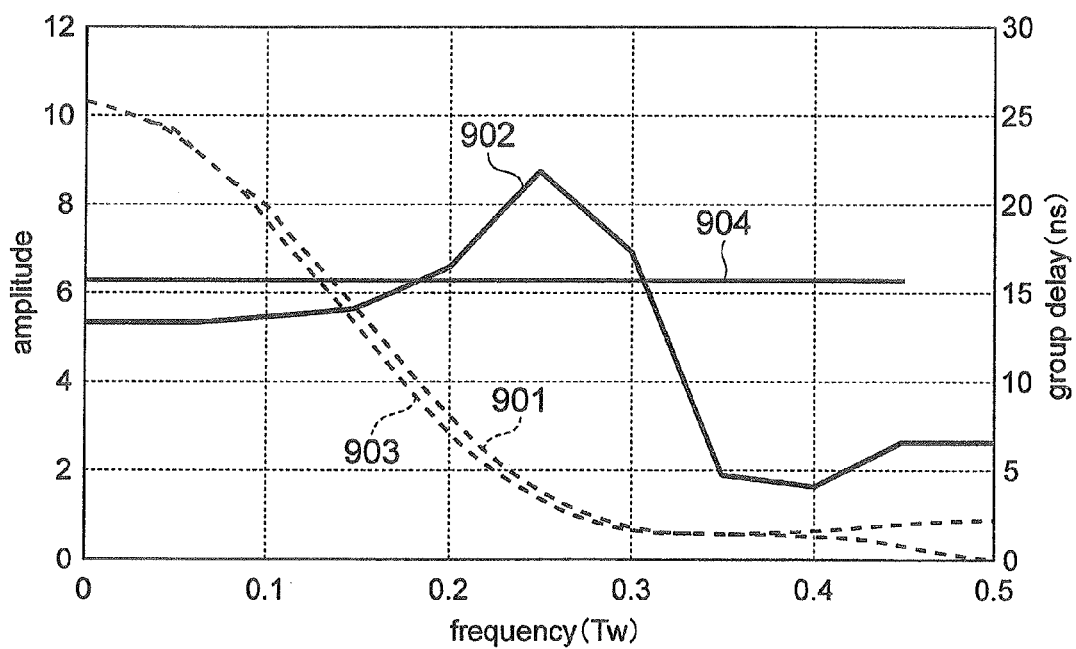
FIG. 9 is a graph showing amplitude and group delay characteristics of the adaptive equalization processing of FIG. 8.

FIG. 8 is a diagram showing an example of a waveform when the adaptive equalization processing is executed for the phase forward-shift waveform 602. In the diagram, the abscissa and the ordinate are similar to those of FIGS. 6 and 7. When the adaptive equalization processing is executed, the filter coefficient is controlled to minimize the equalization error. Hence, the filter coefficient may possibly be controlled, for example, such that the phase shift is set to zero at the edge point 804 as in 801 of the diagram. FIG. 9 shows an amplitude characteristic and a group delay characteristic of the filter in this situation. In the graph, the abscissa represents a ratio of the frequency to the reproduction clock, the ordinate on the left represents the amplitude characteristic, and the ordinate on the right represents the group delay characteristic. In the graph, 901 indicates the amplitude characteristic and 902 indicates the group delay characteristic of the filter characteristics. As above, when the phase shift at the edge point is corrected by the filter, the group delay characteristic is not fixed.

When the equalization processing is executed by the filter having the above characteristic for the waveform 601 not including the phase shift, an equalization error takes place as indicated by 803 at the edge point 804 of 802 in FIG. 8. Accordingly, this possibly leads to a case in which erroneous phase shift information is detected and unnecessary recording strategy adjustment is carried out.

To remove this, a changeover operation is conducted by the switch 115 shown in FIGS. 1 and 3 to select, as the filter coefficient, an output from the coefficient symmetrization circuit 114. 903 and 904 of FIG. 9 indicate the amplitude characteristic and the group delay characteristic of the filter when the processing is executed. When the filter coefficient is calculated to be symmetric with respect to the tap center in the time-axis direction and is applied, the group delay can be fixed.

Figure 10:
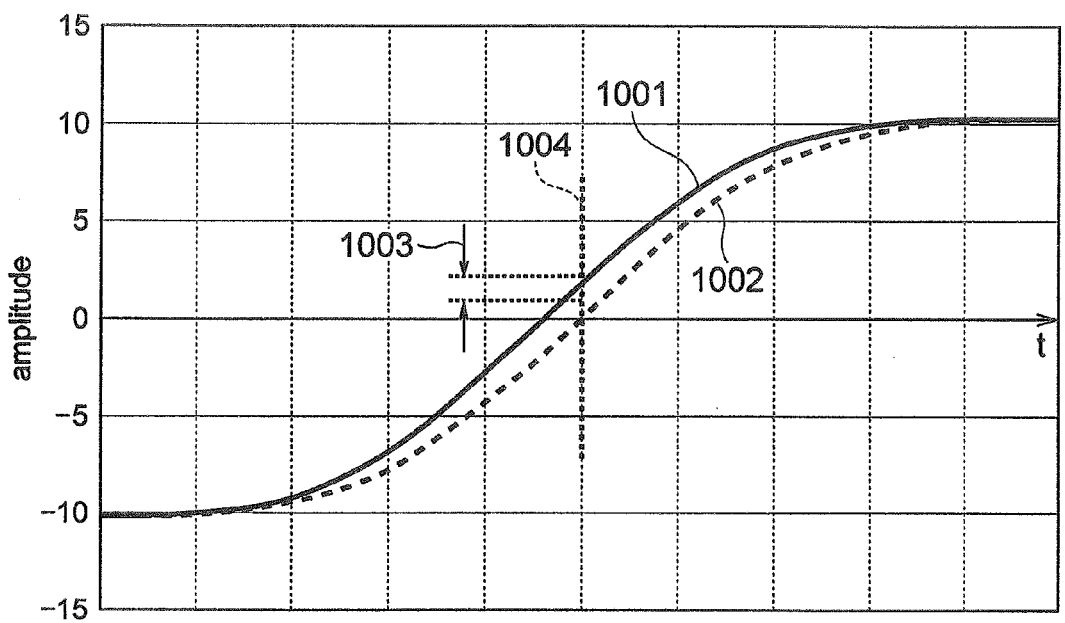
FIG. 10 is a graph showing equalization output waveforms obtained by executing the adaptive equalization processing with a fixed group delay for a waveform with the phase forward shift of FIG. 6 and for a waveform not having a phase shift.

FIG. 10 shows equalized output waveforms when the phase forward-shift waveform 602 and the waveform 601 not including the phase shift are inputted to the filter for which the group delay is fixed. In FIG. 10, the abscissa and the ordinate are similar to those of FIG. 8. In the graph, 1001 indicates the equalized output waveform of the phase forward-shift waveform 602, and 1002 indicates the equalized output waveform of the waveform 601 not including the phase shift. It is seen that while an equalization error 1003 is detected at an edge point 1004 in the waveform 1001, the error is zero in the waveform 1002. Hence, by symmetrizing the filter coefficients, it is possible to correctly detect the phase shift in the reproduced waveform by use of the equalization error.

Figure 11:
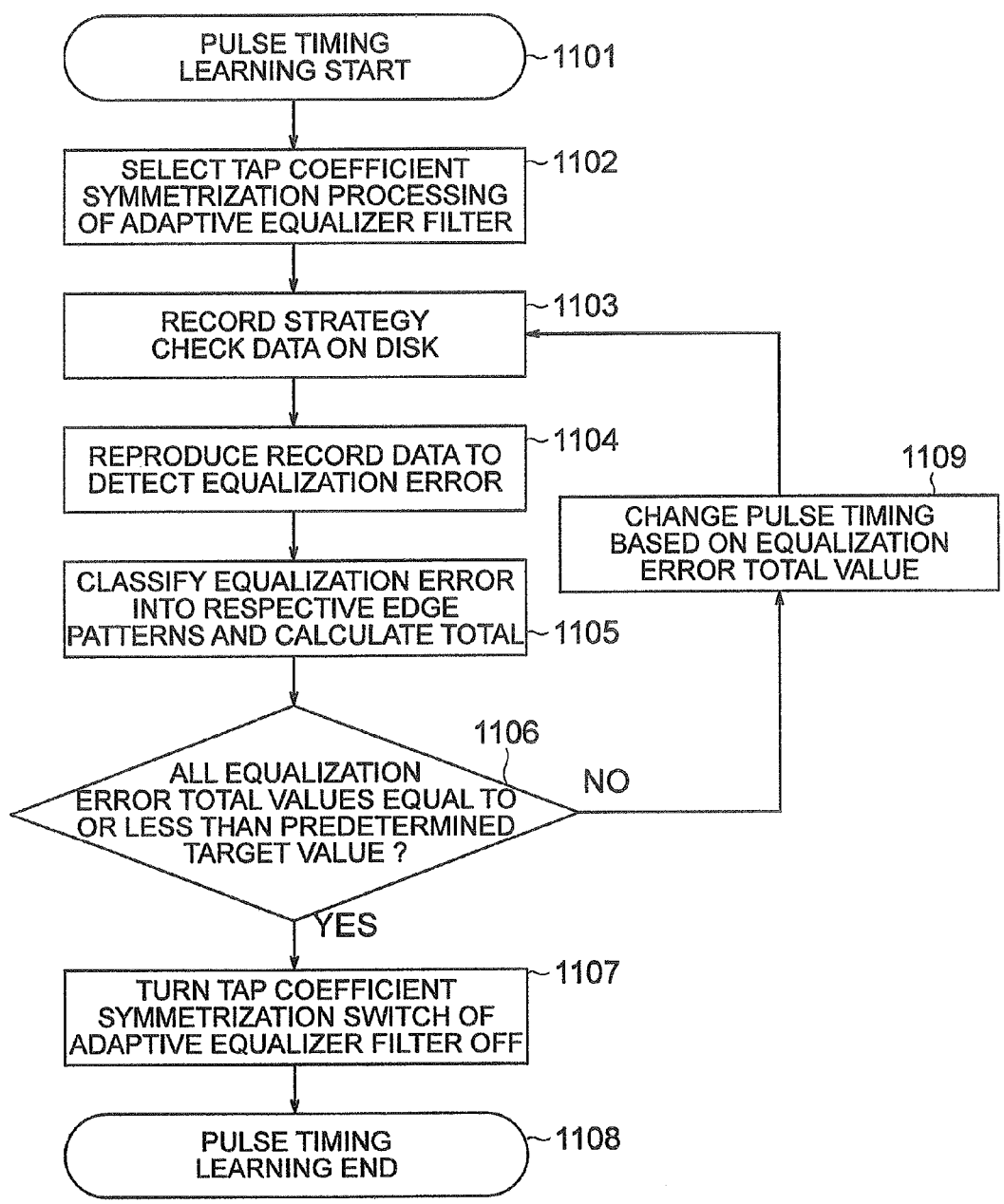
FIG. 11 is a detailed diagram of the FIR filter and its peripheral circuits when an FIR filter having odd-numbered taps is applied to the first embodiment.

FIG. 11 shows a processing sequence in a case wherein the above processing is applied to the recording learning operation, particularly, the pulse timing learning.

At signal reproduction from the optical disk 101 of FIG. 1, to secure the reproduction performance for reproduced signal waveform distortion due to the disk tilt and the like, the switch 115 is set not to select the coefficient symmetrization circuit. When the pulse timing learning is started (1101), the switch 115 of FIGS. 1 and 3 selects, as the filter coefficients, outputs from the coefficient symmetrization circuit (1102). In this situation, processing such as initialization of the filter coefficients $c_3$ to $cm_3$ may be executed according to necessity. Next, data for the recording learning is recorded on a disk (1103). This may be an ordinary data pattern or a special data pattern for the recording learning. The recorded data is reproduced and an equalization error is detected by the equalization error calculation circuit 112 (1004) to be classified for each edge pattern by the phase shift detector circuit 119 to calculate the total (1105). The equalization error total value of each edge pattern is compared with each predetermined target value, i.e., a predetermined target value beforehand set. If equalization error total value is equal to or less than the predetermined target value for all edge patterns (1106), the switch 115 is changed over to set the filter coefficient symmetrization processing off (1107) and then the learning is terminated (1108). In the operation, as in the processing 1102, processing such as initialization of the filter coefficients $c_3$ to $cm_3$ may be executed according to necessity. If the equalization error total value is more than the predetermined target value for any one edge pattern, the pulse timing is changed for the edge pattern according to the detected equalization error total value (1109), and the data recording is again conducted to adjust the strategy.

According to the present invention, in the recording strategy learning for the high-speed recording and reproduction, even if it is difficult to obtain information of the reproduced waveform edge shift due to a condition of a signal transmission path and the like, the reproduced waveform edge shift information can be correctly obtained by use of the PRML processing. The use of the changeover switch enables both of the securing of the reproduction performance using the PRML processing in the high-speed signal processing on an optical disk and the obtaining of the reproduced waveform edge shift information using the PRML processing in association with increase in the speed of the high-speed learning.

Figure 12:
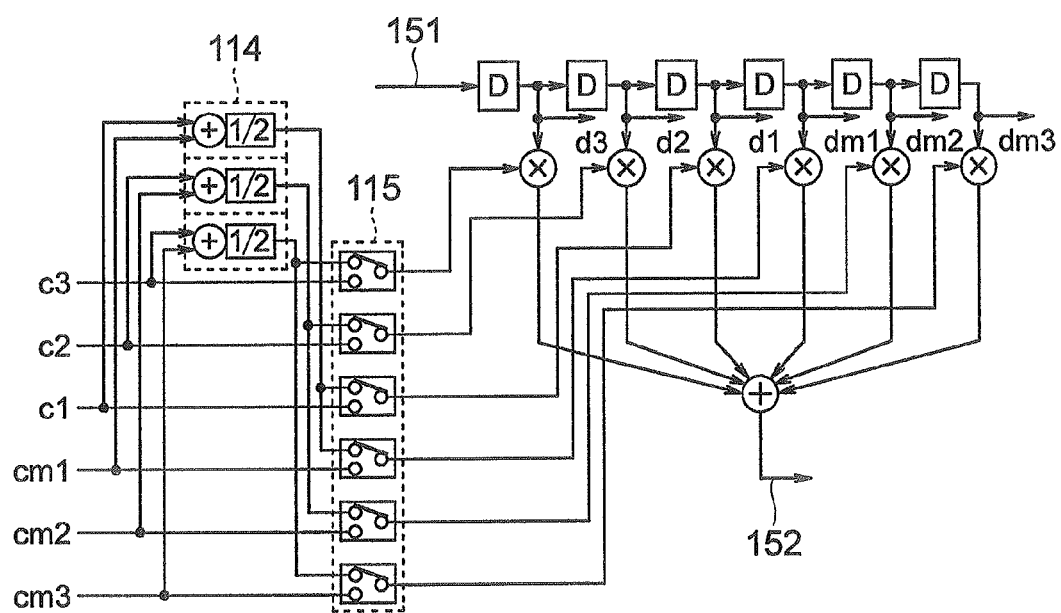
FIG. 12 is a flowchart showing a flow of pulse timing learning processing in the first embodiment.

The above example is an example in which the number of taps of the adaptive equalization filter is an odd number such as 2n+1 (n is an integer). However, if the number of taps is an even number such as 2n (n is an integer), the taps are classified into n right taps and n left taps as shown in FIG. 12 to average the coefficients at tap positions equally apart from both sides, to thereby attain an advantage similar to the advantage described above.

Description has been given of processing in the example in which the obtained equalization error outputs are classified according to the phase compensation table shown in FIG. 4. However, the classifying processing need not be necessarily executed for the pulse timing which does not use the phase compensation table.

Embodiment 2

Figure 13:
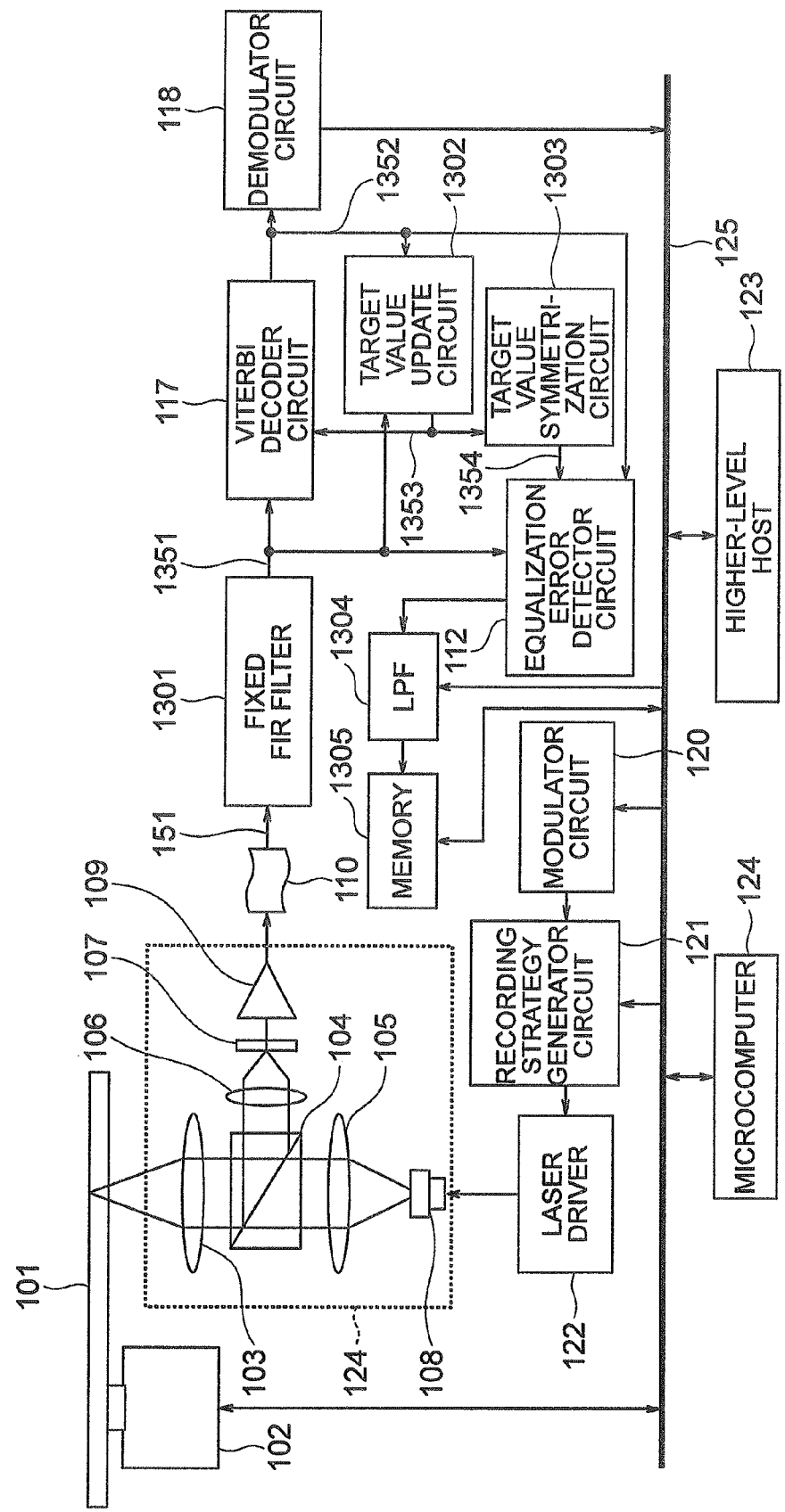
FIG. 13 is a configuration diagram of an optical disk device in a second embodiment.

Next, FIG. 13 shows a system configuration in a second embodiment of the present invention. In FIG. 13, the elements and blocks having the same functions as those of FIG. 1 are assigned with the same reference numerals, and description thereof will be here avoided.

In FIG. 13, 1301 indicates an FIR filter for which the coefficient values are fixed. The taps of the reproduction clock period and structure to calculate the coefficient values are similar to those of the first embodiment. However, in the present embodiment, since the output from the equalization error detector circuit in the succeeding stage is used to adjust edge timing of the recording strategy, the coefficients of the respective taps are set to fixed values such that the values are symmetric in the time-axis direction.

1302 indicates a target value update circuit to update the target equalization characteristic employed in the viterbi decoding shown in Table 1 described above.

Figure 14:
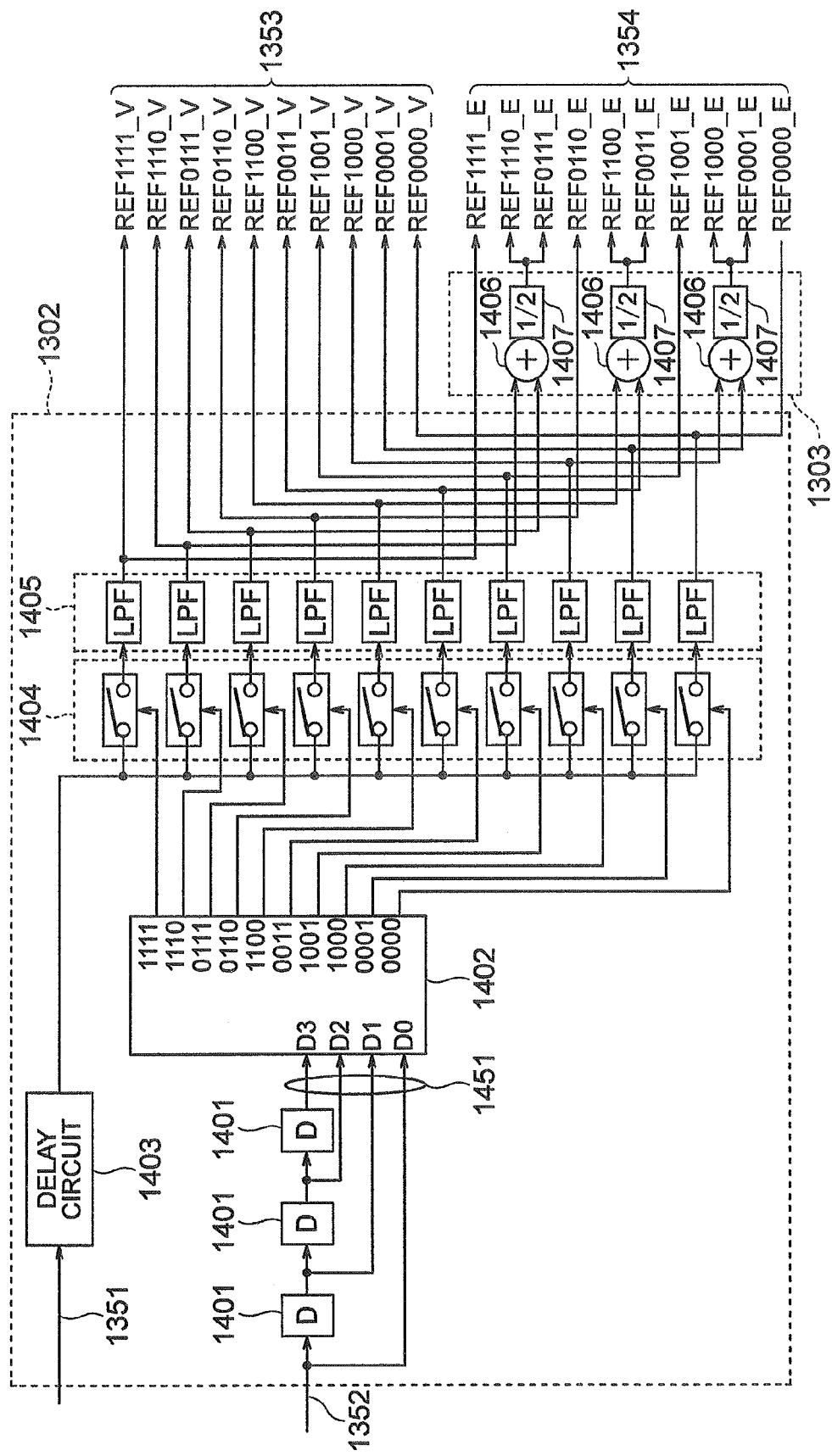
FIG. 14 is a detailed diagram of a target value update circuit, a target value symmetrization circuit, and their peripheral circuits of FIG. 13.

1303 is a symmetrization circuit to symmetrize the updated target values in a time-axis direction. FIG. 14 shows a detailed circuit diagram of the target value update circuit 1302 and the target value symmetrization circuit 1303. It is assumed that the target values of the viterbi circuit are determined by data for quadripartite-time of binary signals, namely, target values having a restriction length of 4.

In FIG. 14, 1401 are delay elements in reproduction channel clock units, the elements convert a binary signal 1352 outputted from the viterbi circuit 117 into a 4-bit parallel signal 1451. 1402 is a decoder to convert the 4-bit parallel signal 1451 into eight bits. 1403 is a delay circuit to match the phase between the output from the decoder 2 and the output waveform 1351 from the fixed FIR filter 1301. A group of switches 1404 include switches which are controlled to be turned on or off according to outputs from the decoder 1402. As a result, there is selected an amplitude value of the filter output waveform 1351 corresponding to each quadripartite-time pattern of the binary signal 1352 to be averaged by a group of LPF 1405 in the succeeding stage. By employing the averaged output 1353 in place of the target value of the viterbi decoder circuit shown in Table 1, asymmetry information of the reproduced signal 151 is reflected in the target value via the fixed FIR filter 1301. Hence, it is possible to execute more stable viterbi decoding processing adapted to the reproduced signal.

This will be hereinbelow referred to as adaptive viterbi decoding processing and the processing circuit will be referred to as adaptive viterbi decoder circuit.

When the recording learning is conducted by calculating the equalization error as in the first embodiment of the present invention by use of the target value 1353 of the adaptive viterbi decoder circuit and the output 1351 from the fixed FIR filter, the edge phase shift of the reproduced signal is reflected in the target value and the correct equalization error cannot be detected. To avoid this difficulty, the target value is controlled to fix the group delay characteristic of the target equalization characteristic. For this purpose, target values of a pattern symmetric in a time-axis direction are symmetrized by averaging. The patterns symmetric in a time-axis direction include the following combinations for the target values with a restriction length of four as indicated in 1303 of FIG. 14.

1. Pattern (1,1,1,0) and pattern (0,0,0,1)
2. Pattern (1,1,0,0) and pattern (0,0,1,1)
3. Pattern (1,0,0,0) and pattern (0,0,0,1)

For these patterns, the target values are averaged by adder circuits 1406 and divider circuits 1407 shown in FIG. 14. By averaging the target values in the time-axis direction, the equalization characteristic of the rising waveform is equalized to that of the falling waveform, to thereby obtain an advantage similar to the advantage of the coefficient symmetrization when the equalized characteristic is realized by the FIR filter.

In FIG. 13, 1304 is a Low Pass Filter (LPF) to average outputs from the equalization error detector circuit and has a function to be reset by the microcomputer 124 according to necessity. 1305 indicates a memory capable of storing therein a plurality of combinations each including an equalization error value averaged by the LPF 134 and a recording parameter set to the recording strategy generator circuit.

Figure 15:
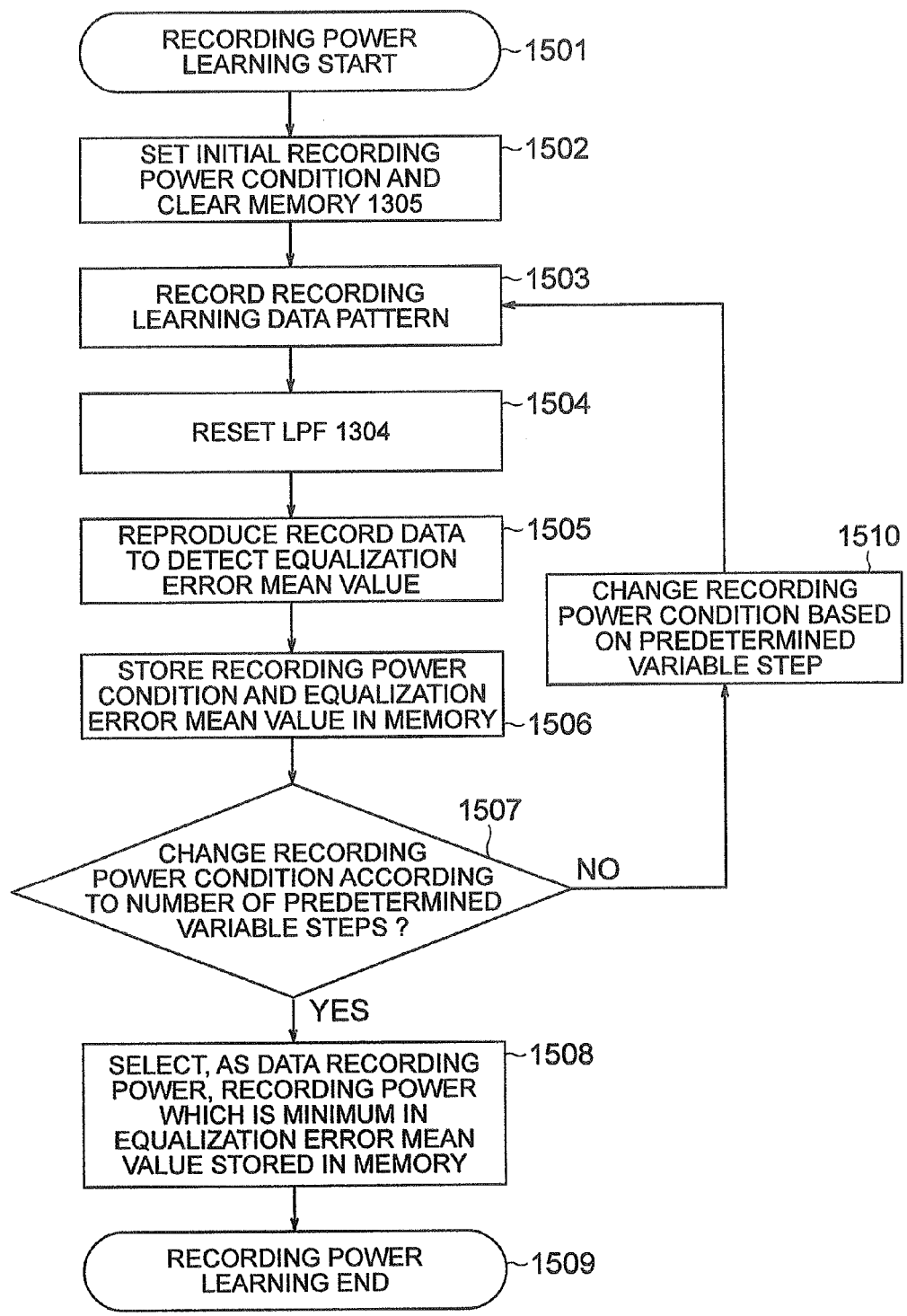
FIG. 15 is a flowchart showing a flow of recording power condition learning processing in the second embodiment.

FIG. 15 shows a processing sequence when the above processing is applied to the recording learning operation, particularly to the recording power learning. For the recording power learning in this embodiment, FIG. 2 shows Pw, Ps, Pc, and ratios therebetween.

Figure 16:
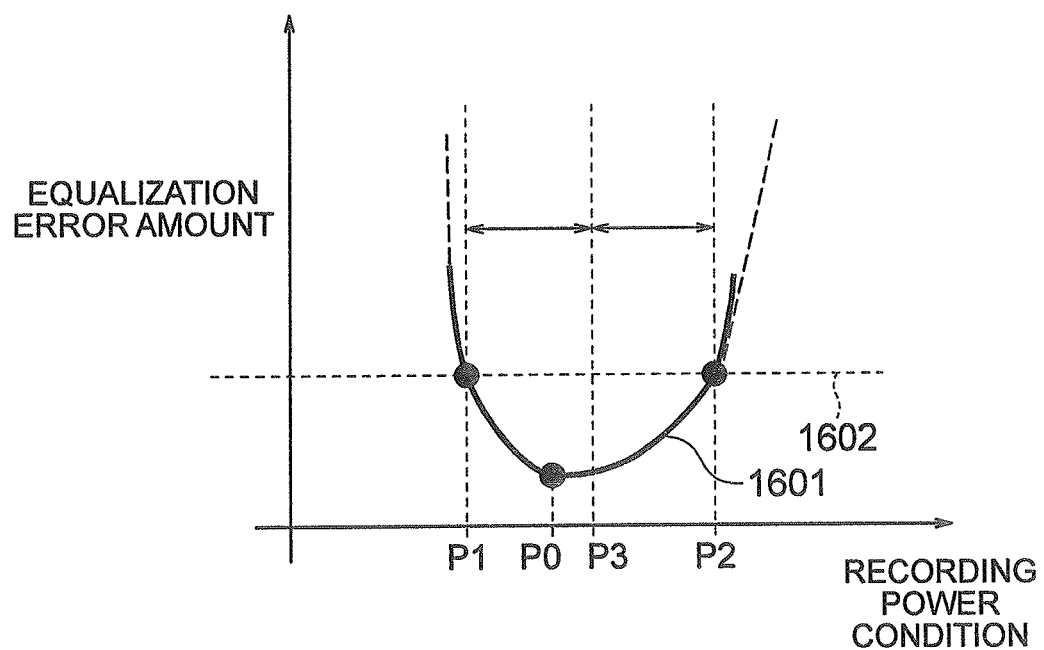
FIG. 16 is a graph showing an example of a bucket curve "recording power condition versus detected equalization error amount" in the second embodiment.

When the recording power learning is started (1501), the microcomputer 124 of FIG. 13 sets an initial recording power condition to the recording strategy generator circuit 121 and then clears the memory 1305 to be used for the learning (1502). Next, the microcomputer 124 records a recording learning data pattern (1503). Thereafter, the microcomputer 124 resets and initializes the LPF 1304 (1504). The microcomputer 124 reproduces recorded data to detect an equalization error mean value (1505) to store the recording power condition and the equalization error mean value (1506). The above processing from 1503 to 1506 is executed for a predetermined number of steps while changing the recording power condition in a predetermined variable step (1507, 1510). After terminating the processing by executing the processing for the predetermined number of steps, the system obtains as shown in FIG. 16 a bucket curve 1601 in which the recording power condition and the equalization error mean value stored in the memory by the microcomputer or the like are represented on the abscissa and the ordinate, respectively. The system searches for a recording power condition P0 under which the equalization error mean value is minimized in the bucket curve, sets the power as the data recording power to the strategy generator circuit (1508), and terminates the recording power learning (1509). If it is difficult in the processing 1507 to retrieve the minimum value of the equalization error mean value due to the contour of the bucket curve or the like, it may be possible that, for example, an intermediate value P3 of the recording power conditions P1 and P2 for a predetermined equalization error mean value is retrieved as the power condition value.

In the processing, when compared with the processing sequence of the first embodiment shown in FIG. 11, the changeover control 1102 and 1107 of the coefficient symmetrization filter is not required. Hence, the processing steps of the recording learning can be accordingly reduced and the recording learning time can be shortened.

In the present embodiment, by adapting the target value of the viterbi decoder circuit to the reproduced waveform, the phase shift can be detected in the stable reproduced waveform by use of the PRML processing as in embodiment 1. The recording waveform can be learned by using the phase shift while improving stability of the binarization processing of the viterbi decoding.

In the recording learning processing sequence of the present embodiment, there is used a scheme in which the recording is conducted under a plurality of conditions by changing the recording power condition as a recording parameter and then by reproducing the recorded items to extract a recording power condition under which the equalization error total value is minimized. However, the present scheme is also applicable to the pulse timing learning of the first embodiment. In this case, for each mark pattern and each space pattern, a search is made for pulse timing at which the classified equalization error mean value is minimized. The pulse timing condition for which the recording compensation table shown in FIG. 4 is not used can be learned in a method similar to the method of the present embodiment.

Embodiment 3

Application to Verifying Operation

Figure 17:
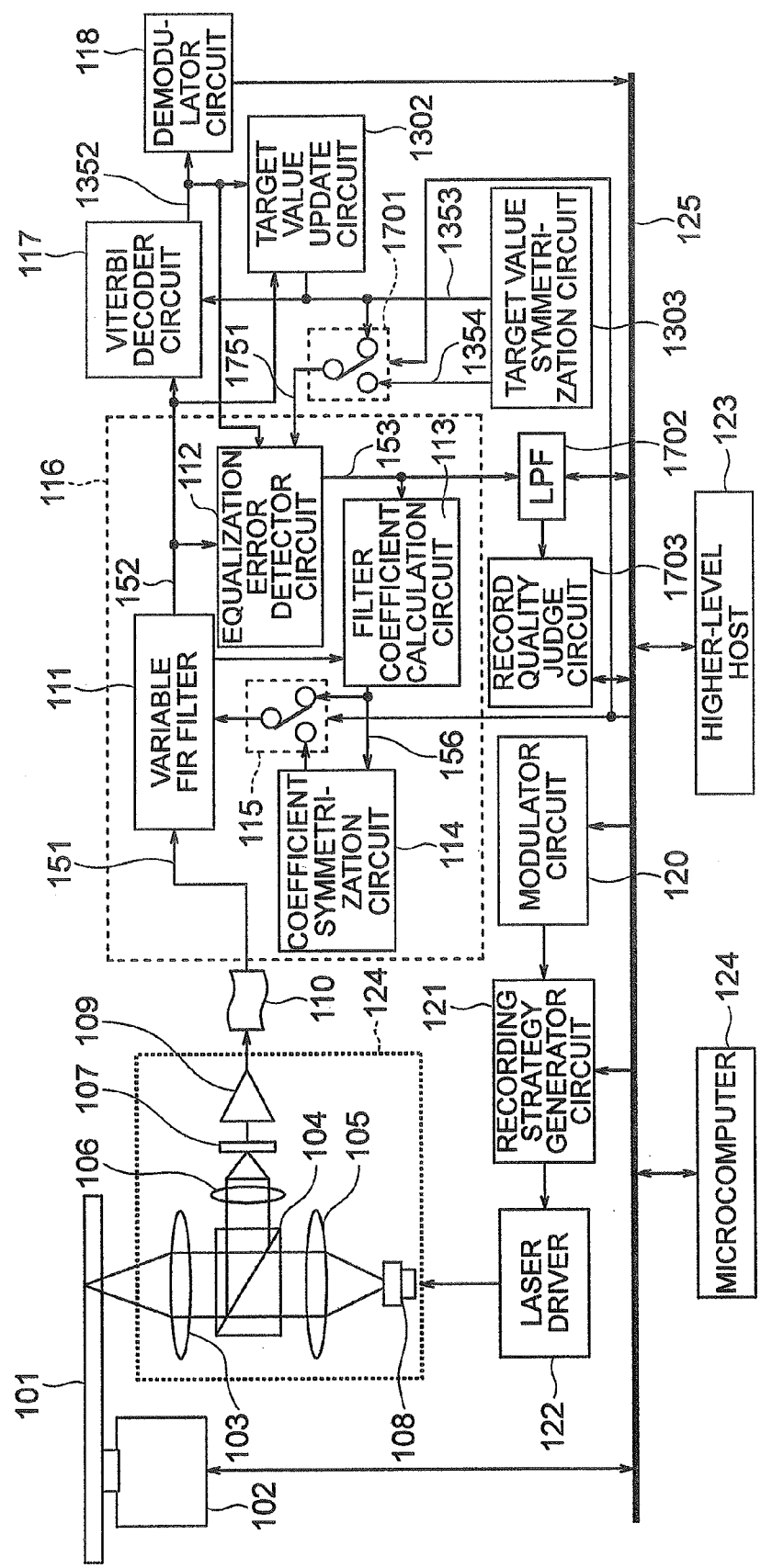
FIG. 17 is a configuration diagram of an optical disk device in a third embodiment.

FIG. 17 shows a circuit configuration of the third embodiment of the present invention. In FIG. 17, the elements and blocks having the same functions as those of FIGS. 1 and 13 are assigned with the same reference numerals, and description thereof will be here avoided.

Figure 18:
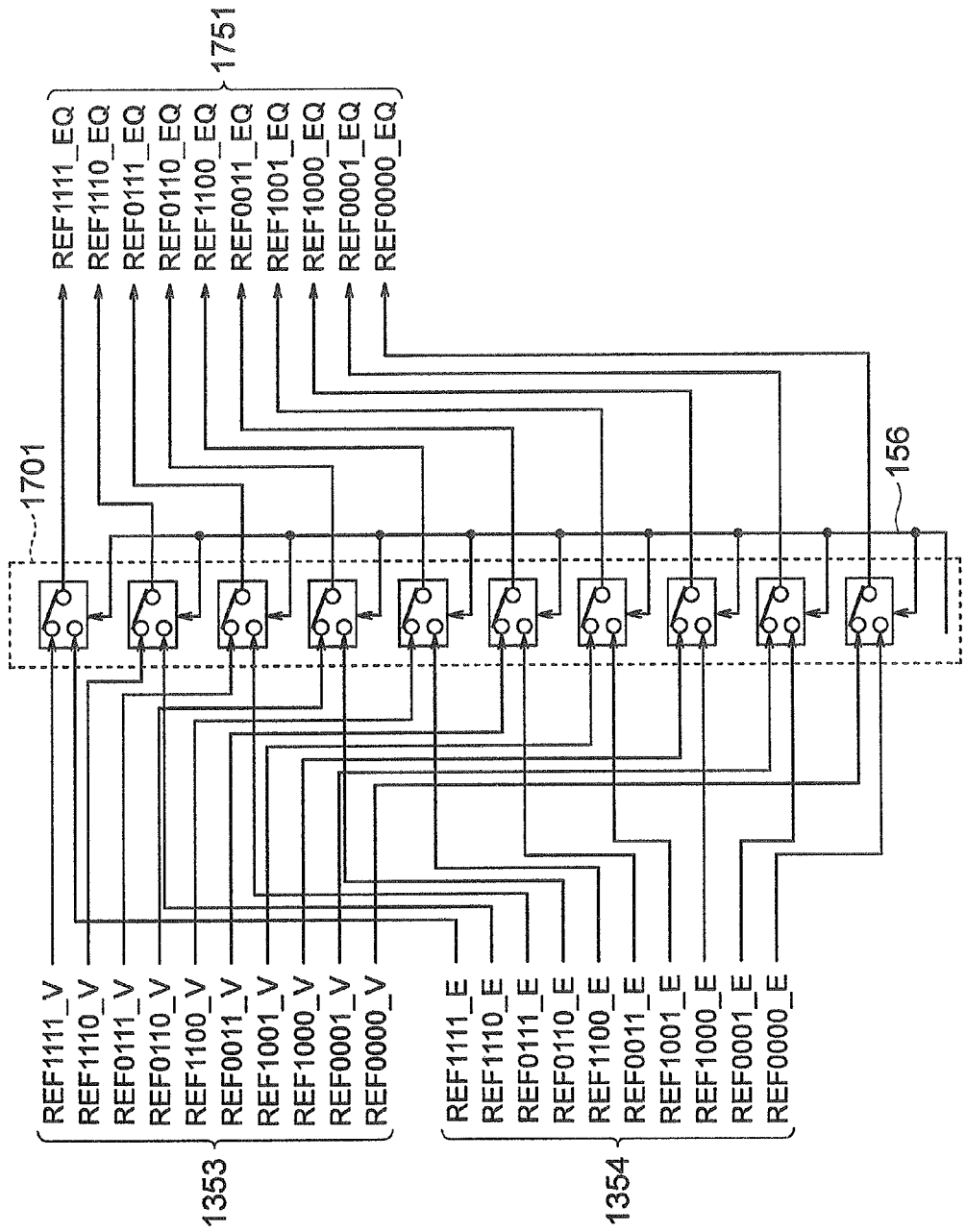
FIG. 18 is a detailed diagram of a switch 1701 of FIG. 17.

The circuit configuration includes both of the function of the adaptive equalization circuit of the first embodiment and that of the adaptive viterbi decoder circuit of the second embodiment. FIG. 18 shows details of a switch 1701. The switch 1701 conducts, for the equalization target value to calculate the equalization error in the equalization error detector circuit, a changeover operation between an update target value 1353 generated from the equalized output 152 and the binary signal 1352 and a symmetrization target value 1354 obtained by symmetrizing the symmetrization target value 1353. FIG. 18 shows the switch 1701 in detail. In the switch changeover, the update target value 1353 is selected in the ordinary data reproduction. In other operations, for example, in the recording learning shown in the first and second embodiments and in the execution of recording quality judgment of the present embodiment, the symmetrization target value 1354 is selected. 1702 indicates a Low Pass Filter (LPF) to average the equalization error values detected by 112 and has a function to be reset by the microcomputer 124 according to necessity. 1703 is a circuit which compares the equalization error mean value attained from 1702 with a predetermined equalization error target value to carry out the recording quality judgment.

Figure 19:
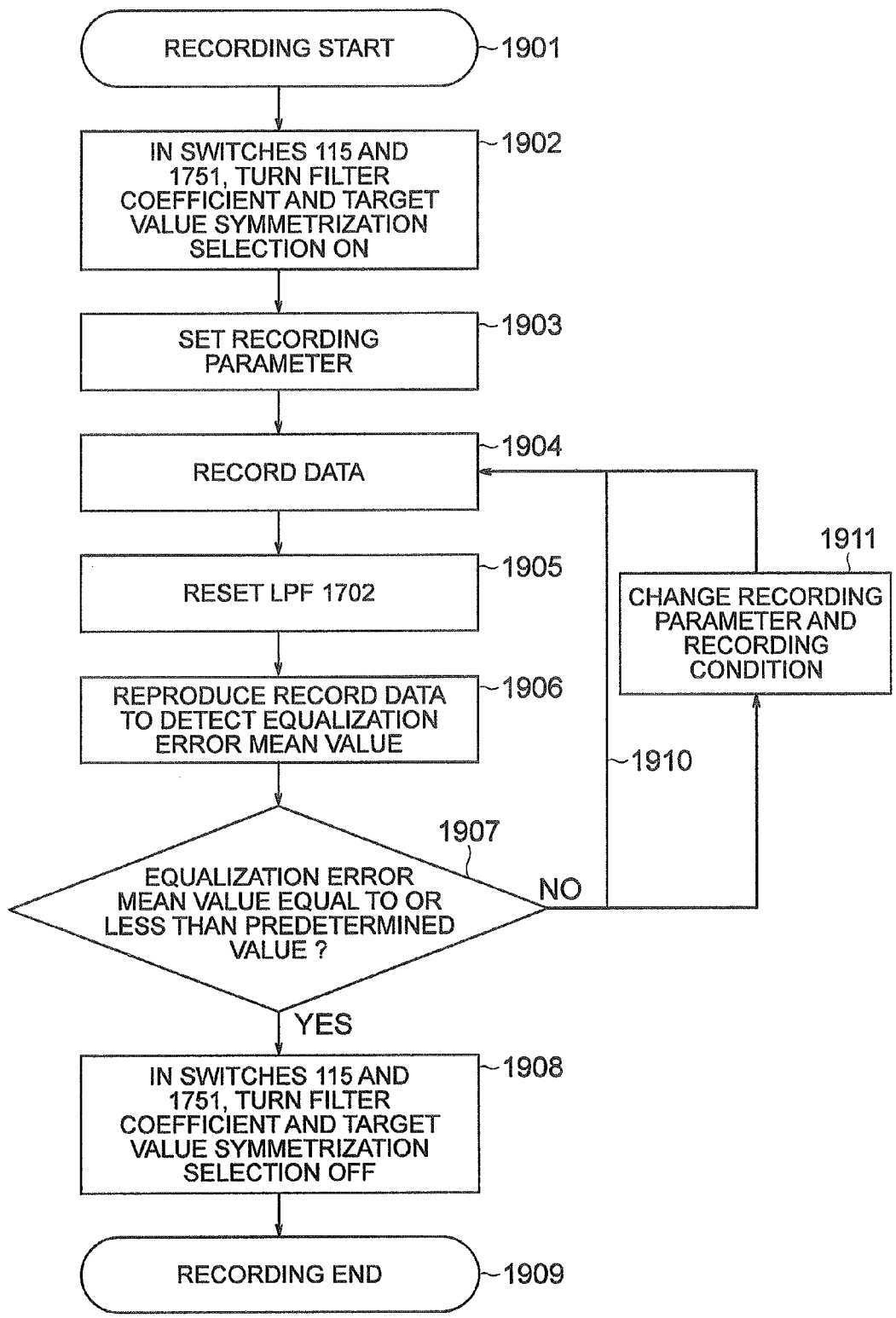
FIG. 19 is a flowchart showing a flow of processing of data recording operation including a verifying operation in the second embodiment.

FIG. 19 shows a processing sequence when the above circuit configuration is applied to the data recording operation associated with the verifying operation.

When reproducing the signal from the optical disk 101 of FIG. 17, to secure the reproduction performance for the reproduced signal waveform distortion due to the disk tilt or the like, the switches 115 and 1751 are set not to select the coefficient symmetrization circuit and the target value symmetrization circuit. When the recording processing is started (1901), the switches 115 and 1751 are set to on to select the filter coefficient symmetrization and the target value symmetrization (1902). Next, the microcomputer 124 sets a recording parameter to the recording strategy generator circuit 121 (1903) to record data (1904). The microcomputer 124 then resets and initializes an equalization error averaging LPF 1702 (1905) and reproduces the recorded data to detect an equalization error mean value (1906). Subsequently, a recording quality judge circuit 1703 compares the equalization error mean value with a predetermined equalization error target value to judge whether or not the equalization error mean value is equal to or less than the predetermined equalization error target value (1907). If the equalization error mean value is equal to or less than the equalization error target value, the switches 115 and 1751 are set to off not to select the filter coefficient symmetrization and the target value symmetrization (1908) and then the recording processing is terminated (1909).

If the equalization error mean value is equal to or more than the equalization error target value in processing 1907, recording failure is assumed and then the recording is conducted again in the same area (1910). The recording condition such as the recording parameter may be changed when the recording is conducted again (1911). In the recording parameter change operation, the recording parameter may be changed on the basis of the equalization error mean value or an index value other than the equalization error mean value, for example, a p value indicating magnitude of the asymmetry of the reproduced waveform.

By executing the above processing, in a case wherein recording quality confirmation is conducted, i.e., data recording including so-called verifying processing is carried out at a high speed, even when it is difficult to correctly judge the recording quality due to the band condition of the signal transmission path, the recording quality can be correctly judged by use of the adaptive equalization processing. This enables to secure compatibility between the quality evaluation in low-speed recording in which the transmission path band can be fully secured for the signal band and the quality evaluation in high-speed recording in which it is difficult to secure the transmission path band.

Embodiment 4

Handling of Learning Operation for Other than Recording System

Figure 20:
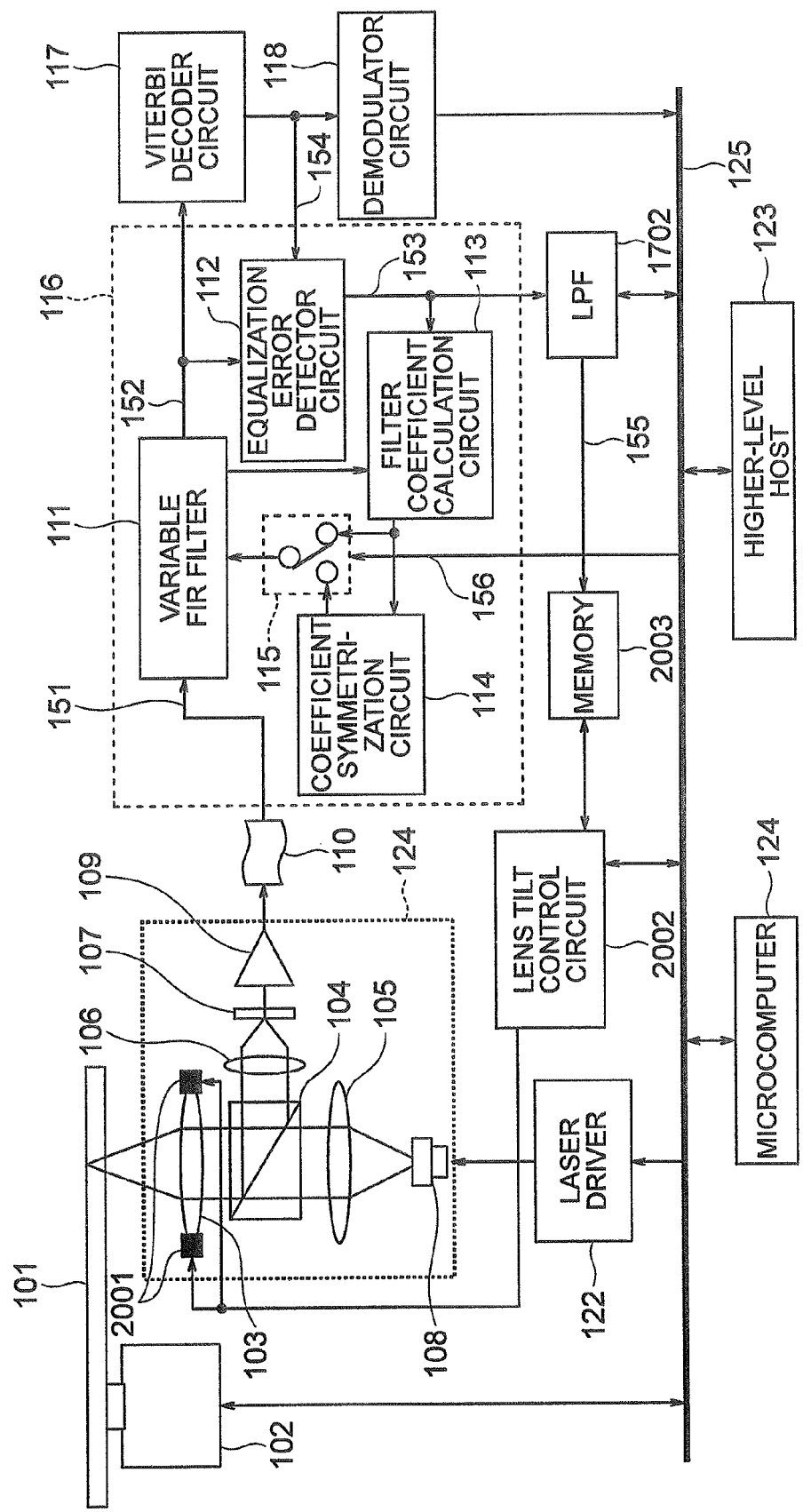
FIG. 20 is a configuration diagram of an optical disk device in a fourth embodiment.

FIG. 20 shows a circuit configuration of the fourth embodiment of the present invention. In FIG. 20, the elements and blocks having the same functions as those of FIGS. 1 and 17 are assigned with the same reference numerals, and description thereof will be here avoided.

A lens tilt control circuit 2002 controls an actuator 2001 to change magnitude of the tilt of the objective 103 with respect to the disk 101. The control circuit 2002 stores in a memory 2003 a pair of the control quantity of the actuator 2001 for each of a plurality of conditions and the equalization error mean value outputted from the LPF 1702, and makes a search for an optimal value of the magnitude of tilt for the objective.

Figure 21:
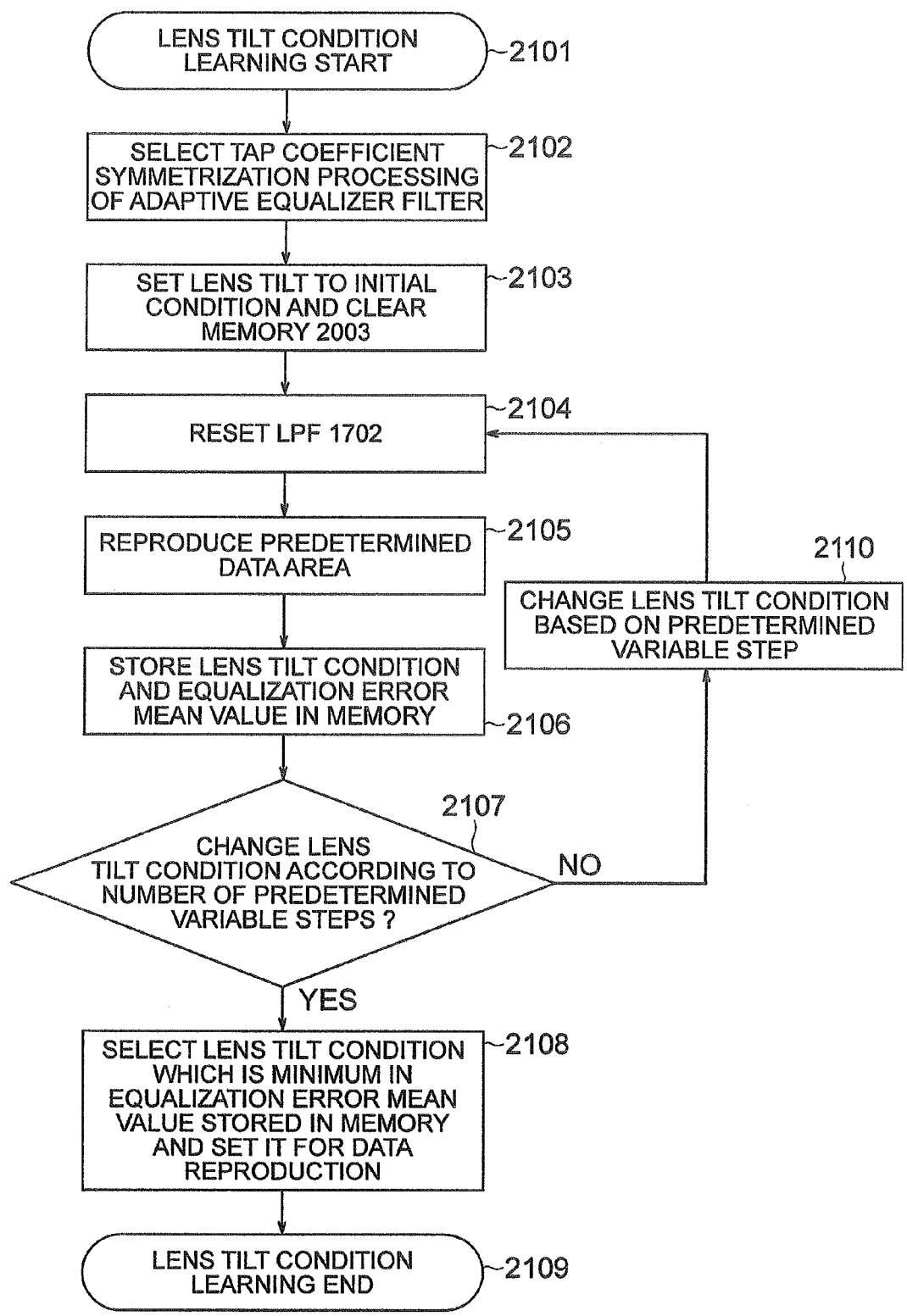
FIG. 21 is a flowchart showing a flow of lens tilt learning processing in the fourth embodiment.

FIG. 21 shows a flow of the processing.

Figure 22:
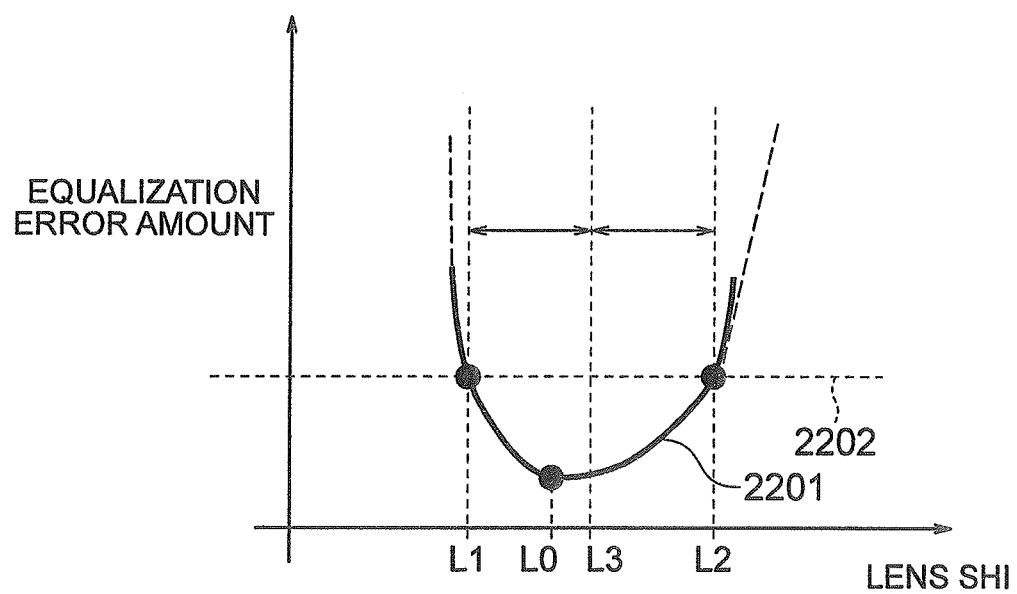
FIG. 22 is a graph diagram showing an example of a bucket curve "recording power condition versus detected equalization error amount" in the fourth embodiment.

At reproduction of signals from the optical disk 101 of FIG. 20, to secure the reproduction performance for the reproduced signal waveform distortion due to the disk tilt or the like, the switch 115 is set not to select the coefficient symmetrization circuit. When the lens tilt learning is started (2101), the switch 115 of FIG. 20 selects, as the filter coefficient, the output from the coefficient symmetrization processing circuit (2102). In this situation, there may be executed processing such as initialization of the filter coefficient according to necessity. Next, the microcomputer 124 sets an initial lens tilt condition and clears the memory 2003 to be used for the learning (2103). The microcomputer 124 then resets and initializes the LPF 1702 (2104) and reproduces data in a predetermined area (2105). After the reproduction, the microcomputer 124 stores in the memory 2003 a pair of the lens tilt setting condition and the obtained adaptive equalization mean value (2106). The processing from 2104 to 2106 is executed for a predetermined number of steps while changing the lens tilt condition by a predetermined variable step (2107, 2110). After terminating the processing by executing the processing for the predetermined number of steps, the system obtains as shown in FIG. 22 a bucket curve 2201 in which the lens shift condition and the equalization error mean value stored in the memory by the microcomputer or the like are represented on the abscissa and the ordinate, respectively. The system selects, as the lens shift setting for the data reproduction, a lens shift condition L0 under which the equalization error mean value is minimized in the bucket curve (2108), and terminates the lens shift learning (2109). If it is difficult in the processing 2108 to retrieve the minimum value of the equalization error mean value due to the contour of the bucket curve or the like, it is possible that, for example, an intermediate value L3 of the lens shift conditions L1 and L2 for predetermined equalization error mean value 2202 is used as the lens shift condition value as the search result.

By the above processing, in an operation to search for an optimal condition of lens tilt control in the high-speed recording and reproduction, when it is difficult due to the signal transmission path condition or the like to obtain the optimal condition of the high-speed reproduced waveform, it is possible to make a search with high precision for the optimal lens tilt condition for the high-speed reproduction by use of the equalization error in the adaptive equalization processing. In the processing sequence of FIG. 21, there is conducted the optimal value learning of the optimal lens tilt condition for the reproduction. However, if the processing 2105 is modified to recording and reproduction processing and a fixed value, for example, the learning result of the processing sequence of FIG. 21 is employed as the lens tilt condition for the reproduction, an optimal lens tilt condition can be attained for the high-speed recording as for the high-speed reproduction.

The lens tilt condition is employed as the parameter to be learned in the present embodiment. However, for the servo condition in the recording and the reproduction, for example, the offset value and the loop gain value in the focusing and tracking, it is possible to obtain the optimal value by use of a scheme similar to that of the present embodiment. Also, for parameters for the signal reproduction such as the amplifier gain of the reproduced signal and the boost value and the cutoff frequency when a pre-equalizer circuit is disposed in the preceding stage of the adaptive equalization circuit, the optimal values can be obtained by using a scheme similar to the above scheme.

In the first to fourth embodiments described above, although the circuit configuration for the detection of the equalization error and the items to be learned differ from each other, the combinations thereof are not restricted by the embodiments. It is possible to embody the present invention using combinations other than those of the embodiments.

In the embodiments, there are shown adaptation by a 7-tap FIR filter, a fixed equalization circuit, and an example of a restricted length of four in which the PR(1,2,2,1) characteristic is set as the equalization target characteristic for the PR class. A viterbi decoder circuit is employed as a binarization processing circuit conducting the ML decoding. The number of taps of the FIR filter and the restriction length and the PR class in the equalization target characteristic are not related to the gist of the present invention, and hence are not restricted by the embodiments. Similarly, the binarization processing circuit is not restricted by the viterbi decoder circuit.

In the first and third embodiments, symmetrization of the tap coefficients of the FIR filter has been described as a scheme to fix the group delay characteristic of the equalization characteristic of the adaptive equalization circuit. However, the circuit to implement the adaptive equalization processing may also be configured in other ways. In this case, it is only necessary to add, in addition to the adaptive equalization processing, control processing to fix the group delay characteristic of the filter circuit. The method of detecting the group delay in this situation may be implemented such that for example, for a signal of which the characteristic is known, control is carried out to equalize the equalization error in the rising pattern and the falling pattern.

In the embodiments, the mean value of equalization errors at the reproduced waveform edge point is employed as an item to evaluate the optimal value and to confirm the recording quality in the pulse timing learning and the recording power learning. The present invention is always applicable to a case wherein the equalized output waveform in the PRML processing is used for the processing described above. The indices of the optimal value evaluation and the recording quality confirmation are not restricted by the contents described in conjunction with the embodiments.

The present invention enables both of the securing of quality in the information reproduction through the PRML processing from a recording medium and the evaluation of reproduced signals by use of ML decoder such as the PRML processing in the high-speed recording and reproduction. As a result, for the S/N deterioration of signals or the like due to the restriction of the signal transmission characteristic and the increase in the density of record information, the recording parameter and the servo parameter can be stably adjusted through the stable information reproduction and the detection of the signal edge phase shift by use of the PRML.

That is, the high-speed recording and reproduction by realizing a high transfer rate for the to-be-recorded information and reproduced information and various adjustments can be conducted at one and the same speed. Heat generated due to increase in the motor load caused by the speed change can be reduced and occurrence of the rotary regulation wait time associated with the speed change can be suppressed. It is hence possible to implement the stabilization and power saving in the recording learning operation as well as to minimize the learning time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk device configured to radiate laser light onto an information recording medium having information tracks, in order to record information thereon and to reproduce, by use of reflected light therefrom, the information recorded on the information recording medium, the optical disk device comprising:
    a laser light source configured to radiate laser light;
    a laser driver circuit configured to generate a drive current to drive the laser light source;
    a waveform equalizer circuit configured to equalize a reproduced signal obtained from the reflected light;
    a Viterbi decoder circuit configured to conduct Viterbi decoding for a waveform output from the waveform equalizer circuit, in order to output a binary signal;
    a Viterbi decoding reference value control circuit configured to change a reference value of the Viterbi decoder circuit, based on the waveform output from the waveform equalizer circuit and the binary signal;
    a Viterbi decoding reference value correction circuit configured to equalize a value of a Viterbi decoding reference value generated using a binary signal pattern configured to be symmetric in a time-axis direction;
    an equalization error detector circuit configured to detect an amount of an equalization error, based on a difference between the waveform output from the waveform equalizer circuit and the reference value outputted from the Viterbi decoding reference value correction circuit;
    a recording waveform generator circuit configured to control the laser driver circuit, based on information to be recorded and a recording strategy; and
    a recording strategy adjuster circuit configured to adjust parameters of the recording strategy, based on the equalization error amount.

2. An optical disk device according to claim 1, further comprising:
a Viterbi decoding reference value correction circuit configured to equalize, in the Viterbi decoding reference value control circuit, a value of a reference value generated by using a binary signal pattern configured to be symmetric in a time-axis direction; and
a Viterbi decoding reference value control changeover switch configured to conduct a changeover, between use and non-use of the correcting operation by the Viterbi decoding reference value correction circuit.

3. An optical disk device according to claim 2, the optical disk device conducting the changeover of the Viterbi decoding reference value control changeover switch such that:
the Viterbi decoding reference value correction circuit is not used when information reproduction is conducted by inputting the reproduced signal obtained from the information recording medium to the binarizer circuit; and
the Viterbi decoding reference value correction circuit is used when parameters of the recording strategy are adjusted.

4. An optical disk device according to claim 2, wherein the optical disk device is configured to conduct the changeover of the Viterbi decoding reference value control changeover switch such that:
the Viterbi decoding reference value correction circuit is not used when information reproduction is conducted by inputting the reproduced signal obtained from the information recording medium to the binarizer circuit; and
after recording information on an information recording medium, the recorded information is reproduced by use of the Viterbi decoding reference value correction circuit, and if the equalization error amount obtained is equal to or more than a predetermined value, the same information recording is again conducted on the information recording medium.

5. An optical disk device according to claim 1, wherein the waveform equalizer circuit has a fixed group delay characteristic with respect to a frequency.

6. An optical information reproduction method of reproducing recorded information by use of reflected light obtained by radiating laser light onto an information recording medium having information tracks, including changing over a reference value control of a Viterbi decoding such that:
when a reproduced signal obtained from an information recording medium is inputted via an equalizer circuit to a Viterbi decoder circuit to conduct information reproduction, controlling a reference value of the Viterbi encoding in order to minimize branch metrics of the Viterbi decoder circuit; and
when a quality of a reproduced signal is evaluated, controlling the reference value of the Viterbi encoding to minimize the branch metrics of the Viterbi decoder circuit and to equalize a reference value of the Viterbi decoder circuit generated using a binary signal pattern configured to be symmetric in a time-axis direction.

7. An optical information recording method of recording information by radiating a recording strategy, in the form of a time-series pulse train of laser light, onto an information recording medium having information tracks,
the method being associated with optical information recording in which an information recording method is controlled by use of a magnitude of a phase shift of a reproduced signal obtained by reproducing recorded data recorded on the information recording medium by the optical information recording method,
the method being associated with optical information recording calculating a reference value of a Viterbi decoding circuit by use of an equalization output signal obtained by inputting the reproduced signal to an equalizer circuit and a binary signal obtained by inputting the equalization output signal to Viterbi decoding, to obtain the phase shift magnitude by use of a difference between the reference value and the equalization output signal, and
controlling the reference value to minimize the branch metrics of the Viterbi decoder circuit and to equalize a reference value generated using a binary signal pattern configured to be symmetric in a time-axis direction.

8. An optical information recording method according to claim 7, wherein the recording strategy is adjusted by use of a magnitude of a phase shift of a reproduced signal obtained from an information recording medium.

9. An optical information recording method according to claim 7, wherein if a magnitude of a phase shift of a reproduced signal obtained from an information recording medium is equal to or more than a predetermined value, the same information recording is again conducted on the information recording medium.

10. An optical information recording method according to claim 7, wherein the method is configured to conduct a changeover operation between
a first reference value control method to control a reference value of Viterbi decoding to minimize branch metrics of the Viterbi decoder circuit; and
a second reference value control method to control the reference value of Viterbi decoding to minimize branch metrics of the Viterbi decoder circuit and to equalize the reference value of the Viterbi decoder circuit generated using a binary signal pattern symmetric in a time-axis direction such that
when the recording strategy recorded on the information recording medium is adjusted, the second reference value control method is used;
when the reproduced signal obtained from the information recording medium is inputted via the equalizer circuit to the Viterbi decoder circuit to conduct information reproduction, the second reference value control method is used to adjust the recording strategy.

* * * * *